United States Patent
Noguchi et al.

(10) Patent No.: US 9,179,132 B2
(45) Date of Patent: Nov. 3, 2015

(54) DEPTH SIGNAL GENERATION APPARATUS, PSEUDO STEREO IMAGE SIGNAL GENERATION APPARATUS, DEPTH SIGNAL GENERATION METHOD, PSEUDO STEREO IMAGE SIGNAL GENERATION METHOD, COMPUTER-READABLE RECORDING MEDIUM RECORDING DEPTH SIGNAL GENERATION PROGRAM, AND COMPUTER-READABLE RECORDING MEDIUM RECORDING PSEUDO STEREO IMAGE SIGNAL GENERATION PROGRAM

(71) Applicant: JVC KENWOOD Corporation, Yokohama-shi, Kanagawa (JP)

(72) Inventors: Hiroshi Noguchi, Yokohama (JP); Junichi Hasegawa, Yokohama (JP)

(73) Assignee: JVC KENWOOD Corporation, Yokohama-shi, Kanagawa (JP)

( * ) Notice: Subject to any disclaimer, the term of this patent is extended or adjusted under 35 U.S.C. 154(b) by 413 days.

(21) Appl. No.: 13/861,041

(22) Filed: Apr. 11, 2013

(65) Prior Publication Data
US 2013/0242047 A1 Sep. 19, 2013

Related U.S. Application Data

(63) Continuation of application No. PCT/JP2011/073344, filed on Oct. 11, 2011.

(30) Foreign Application Priority Data

Oct. 12, 2010 (JP) ................................. 2010-229760

(51) Int. Cl.
*H04N 13/00* (2006.01)
*H04N 13/02* (2006.01)
*G06T 7/00* (2006.01)

(52) U.S. Cl.
CPC .......... *H04N 13/0271* (2013.01); *G06T 7/0051* (2013.01); *H04N 13/0022* (2013.01); *H04N 13/026* (2013.01); *H04N 2013/0081* (2013.01)

(58) Field of Classification Search
CPC .................. H04N 2013/0081; H04N 13/0022; G06T 7/0051
USPC .................. 348/43, 42, 51, 578, 44; 382/154; 345/419
See application file for complete search history.

(56) References Cited

U.S. PATENT DOCUMENTS 8,463,019 B2 * 6/2013 Yamada et al. ................ 382/154
8,599,198 B2 * 12/2013 Yamada ........................ 345/419

FOREIGN PATENT DOCUMENTS

| JP | 2006-186795 A | 7/2006 |
| JP | 2008-167282 A | 7/2008 |
| JP | 4214529 A | 11/2008 |

OTHER PUBLICATIONS

Form PCT/ISA/237, three (3) pages.

*Primary Examiner* — Jefferey Harold
*Assistant Examiner* — Jean W Desir
(74) *Attorney, Agent, or Firm* — Nath, Goldberg & Meyer; Jerald L. Meyer (57) ABSTRACT

A depth signal generation apparatus includes a depth signal estimation unit, a depth signal histogram generator, and a depth signal level converter. The depth signal estimation unit estimates a depth signal for each pixel of a predetermined unit in a video image signal. The depth signal histogram generator divides a range of a depth signal level which the depth signal can have, into depth signal level regions each having a predetermined range size, determines which depth signal level region includes the depth signal for each pixel, counts the number of pixels included in each depth signal level region to generate depth signal histogram data according to the count value. The depth signal level converter generates a depth signal level conversion curve according to the depth signal histogram data and generates a depth signal after level conversion by executing depth signal level conversion according to the depth signal level conversion curve.

8 Claims, 10 Drawing Sheets

DEPTH SIGNAL GENERATION APPARATUS, PSEUDO STEREO IMAGE SIGNAL GENERATION APPARATUS, DEPTH SIGNAL GENERATION METHOD, PSEUDO STEREO IMAGE SIGNAL GENERATION METHOD, COMPUTER-READABLE RECORDING MEDIUM RECORDING DEPTH SIGNAL GENERATION PROGRAM, AND COMPUTER-READABLE RECORDING MEDIUM RECORDING PSEUDO STEREO IMAGE SIGNAL GENERATION PROGRAM

CROSS REFERENCE TO RELATED APPLICATION

This application is a Continuation of PCT Application No. PCT/JP2011/073344, filed on Oct. 11, 2011, and claims the priority of Japanese Patent Application No. 2010-229760, filed on Oct. 12, 2010, the content of both of which is incorporated herein by reference.

BACKGROUND

The present invention relates to a depth signal generation apparatus, a pseudo stereo image signal generation apparatus, a depth signal generation method, a pseudo stereo image signal generation method, a computer-readable recording medium recording a depth signal generation program therein, and a computer-readable recording medium recording a pseudo stereo image signal generation program therein, for generating a depth signal from a usual still image or moving image, that is, an image (non-stereo image) which is not provided with depth information explicitly, or implicitly as in a stereo image, providing processing based on this depth information for the non-stereo image, and thereby generating and outputting a pseudo stereo image which provides a stereoscopic effect.

In a stereo display system, for enabling the non-stereo image to be viewed in pseudo stereo image viewing, there is performed processing of generating a pseudo stereo image from a usual still image or moving image, that is, an image (non-stereo image) which is not provided with depth information for expressing a stereo object explicitly, or implicitly as in a stereo image.

As an example of such a technique, there is known an approach of generating a stereo image on the basis of a depth signal generated by superimposing a depth model which combines a plurality of basic depth models according to a feature of an input non-stereo image, on an R signal of a non-stereo image, for example (refer to Patent Document 1: Japanese Patent No. 4214529).

In the pseudo stereo image generation technique as represented by patent document 1, when estimation error is caused in the depth signal, there is a possibility that a stereo image generated according to the estimated depth signal provides uncomfortable feeling. Meanwhile, this uncomfortable feeling could be reduced by the use of a weak gain in the depth signal estimation when the stereo image is generated. In such a case, however, the gain becomes weak also in an image area where the estimation error is not caused in the depth signal, and sometimes the whole image provides a poor stereoscopic effect.

SUMMARY

The present invention aims to provide a depth signal generation apparatus, a pseudo stereo image signal generation apparatus, a depth signal generation method, a pseudo stereo image signal generation method, a computer-readable recording medium recording a depth signal generation program therein, and a computer-readable recording medium recording a pseudo stereo image signal generation program therein, for obtaining a pseudo stereo image which provides an excellent stereoscopic effect without causing uncomfortable feeling, from a non-stereo image.

According to a first aspect of the present invention, there is provided a depth signal generation apparatus including: a depth signal estimation unit configured to generate a depth signal which expresses a depth for each pixel of a predetermined unit in a video image signal; a depth signal histogram generator configured to divide a range of a depth signal level which the depth signal can have, into a plurality of depth signal level regions each having a predetermined size, determine which depth signal level region includes the depth signal for each pixel of the predetermined unit, and count the number of pixels included in each depth signal level region to generate depth signal histogram data which expresses a level distribution of the depth signal in the depth signal level regions, according to the counted number of pixels; a gain correction value calculator configured to calculate a dispersion value of the depth signal histogram data and calculate a gain correction value according to the dispersion value; a point generator configured to generate points for generating a depth signal level conversion curve to be used to perform level conversion of the depth signal, according to the gain correction value; an interpolation data generator configured to generate interpolation data which interpolates between the points in the depth signal level conversion curve; and a conversion curve generator configured to generate the depth signal level conversion curve using the points and the interpolation data to perform the level conversion of the depth signal using the depth signal level conversion curve.

According to a second aspect of the present invention, there is provided a pseudo stereo image signal generation apparatus including: the depth signal generation apparatus according to the first aspect; and a stereo pair generation apparatus configured to generate a left eye image signal and a right eye image signal by shifting a texture of the video image signal according to the video image signal and the depth signal which is provided with the level conversion by the depth signal generation apparatus.

According to a third aspect of the present invention, there is provided a depth signal generation method including: generating a depth signal which expresses a depth for each pixel of a predetermined unit in a video image signal; dividing a range of a depth signal level which the depth signal can have, into a plurality of depth signal level regions each having a predetermined size, determining which depth signal level region includes the depth signal for each pixel of the predetermined unit, and counting the number of pixels included in each depth signal level region to generate depth signal histogram data which expresses a level distribution of the depth signal in the depth signal level regions, according to the counted number of pixels; calculating a dispersion value of the depth signal histogram data and calculating a gain correction value according to the dispersion value; generating points for generating a depth signal level conversion curve to be used to perform level conversion of the depth signal, according to the gain correction value; generating interpolation data which interpolates between the points in the depth signal level conversion curve; and generating the depth signal level conversion curve using the points and the interpolation data to perform the level conversion of the depth signal using the depth signal level conversion curve.

According to a fourth aspect of the present invention, there is provided a pseudo stereo image signal generation method including: the depth signal generation method according to the third aspect; and generating a left eye image signal and a right eye image signal by shifting a texture of the video image signal according to the video image signal and the depth signal which is provided with the level conversion.

According to a fifth aspect of the present invention, there is provided a computer readable non-transitory recording medium recording a depth signal generation program for causing a computer to execute a method including: generating a depth signal which expresses a depth for each pixel of a predetermined unit in a video image signal; dividing a range of a depth signal level which the depth signal can have, into a plurality of depth signal level regions each having a predetermined size, determining which depth signal level region includes the depth signal for each pixel of the predetermined unit, and counting the number of pixels included in each depth signal level region to generate depth signal histogram data which expresses a level distribution of the depth signal in the depth signal level regions, according to the counted number of pixels; calculating a dispersion value of the depth signal histogram data and calculating a gain correction value according to the dispersion value; generating points for generating a depth signal level conversion curve to be used to perform level conversion of the depth signal, according to the gain correction value; generating interpolation data which interpolates between the points in the depth signal level conversion curve; and generating the depth signal level conversion curve using the points and the interpolation data to perform the level conversion of the depth signal using the depth signal level conversion curve.

According to a sixth aspect of the present invention, there is provided a computer readable non-transitory recording medium recording a pseudo stereo image signal generation program therein for causing a computer to execute a method comprising: the method according to the fifth aspect; and generating a left eye image signal and a right eye image signal by shifting a texture of the video image signal according to the video image signal and the depth signal which is provided with the level conversion.

According to the present invention, it is possible to obtain a pseudo stereo image which provides a stereoscopic effect without causing uncomfortable feeling, from a non-stereo image.

DETAILED DESCRIPTION

There will be explained an embodiment for a depth signal generation apparatus, a pseudo stereo image signal generation apparatus, a depth signal generation method, a pseudo stereo image signal generation method, a computer-readable recording medium recording a depth signal generation program therein, and a computer-readable recording medium recording a pseudo stereo image signal generation program therein. Note that, in the following explanation, the pseudo stereo image signal generation apparatus includes the depth signal generation apparatus and a stereo pair generation apparatus.

Hereinafter, an embodiment of the present invention will be explained according to the drawings.

Figure 1:
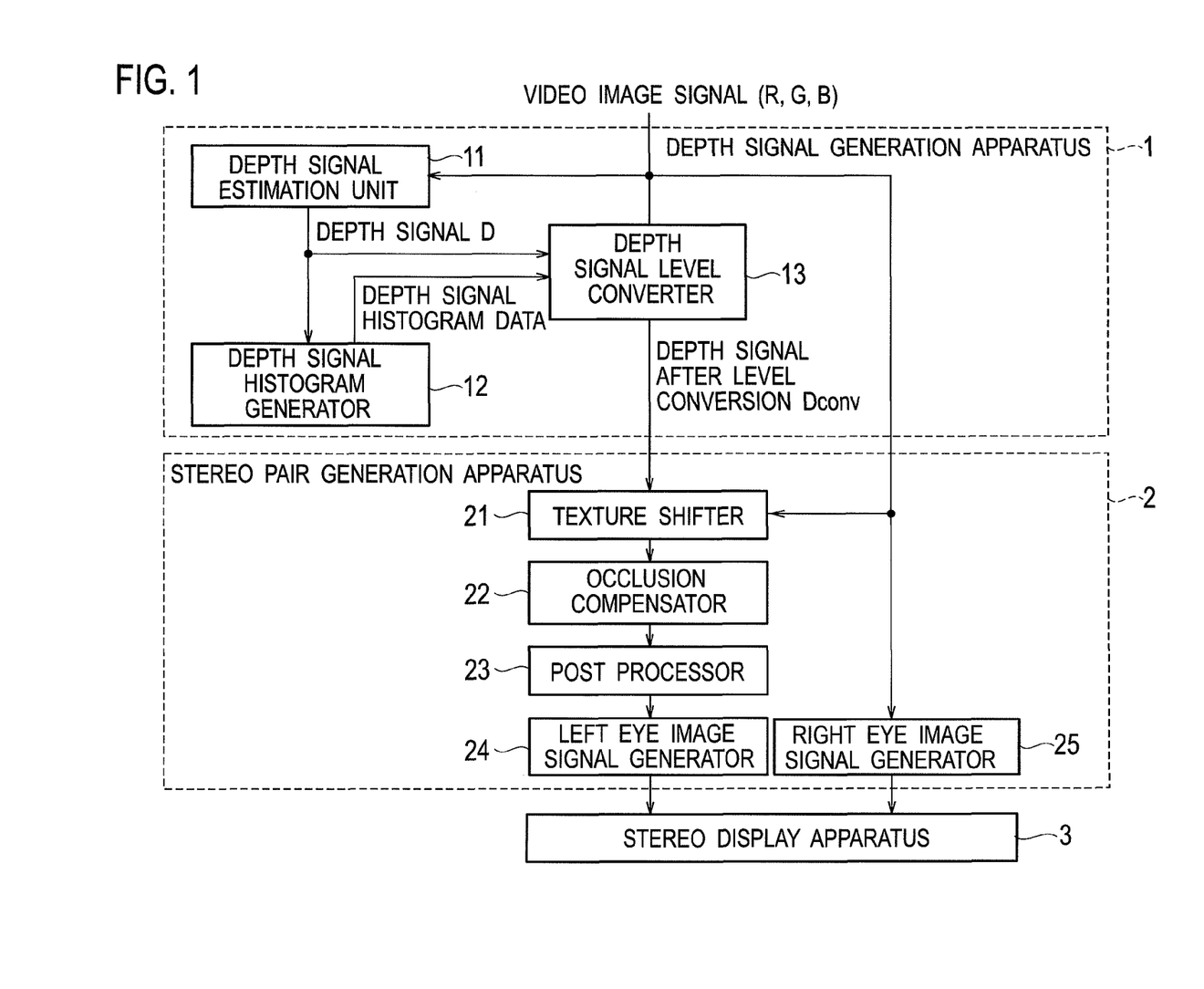
FIG. 1 is a block diagram showing a configuration example of a pseudo stereo image signal generation apparatus according to an embodiment of the present invention.

FIG. 1 is a block diagram showing a configuration example of the pseudo stereo image signal generation apparatus according to an embodiment of the present invention.

As shown in FIG. 1, the pseudo stereo image signal generation apparatus includes the depth signal generation apparatus 1 and the stereo pair generation apparatus 2. The pseudo stereo image signal generation apparatus is not provided with depth information explicitly, or implicitly as in a stereo image. The pseudo stereo image signal generation apparatus is configured to generate a left eye image signal and a right eye image signal from a video image signal (R, G, and B) which is a non-stereo image and composed of a plurality of images continuing in temporal sequence, and configured to output the left eye image signal and the right eye image signal to a stereo display apparatus 3.

The depth signal generation apparatus 1 includes a depth signal estimation unit 11 which generates a depth signal D from the video image signal of the non-stereo image by the same method as that in a depth signal generation apparatus according to the Patent Document 1, a depth signal histogram generator 12, and a depth signal level converter 13. A detailed configuration and operation for each of the depth signal histogram generator 12 and the depth signal level converter 13 will be described below. Note that, while the depth signal D is generated from the video image signal (R, G, and B) of the non-stereo image in the present embodiment, the present invention is not limited to this case. The depth signal D may be generated from any information represented by a brightness component of the video signal or the like.

The stereo pair generation apparatus 2 includes a texture shifter 21 shifting a texture of an input non-stereo image according to a depth signal after level conversion Dconv generated in the depth signal level converter 13, an occlusion compensator 22 compensating occlusion, a post processor 23 performing post processing, a left eye image signal generator 24, and a right eye image signal generator 25.

A left eye image signal and a right eye image signal generated in the stereo pair generation apparatus 2 are input into the stereo display apparatus 3, and a pseudo stereo image is displayed on the stereo display apparatus 3.

(Configuration and Operation Example of the Depth Signal Histogram Generator 12)

Next, there will be explained a configuration and operation example of the depth signal histogram generator 12.

Figure 2:
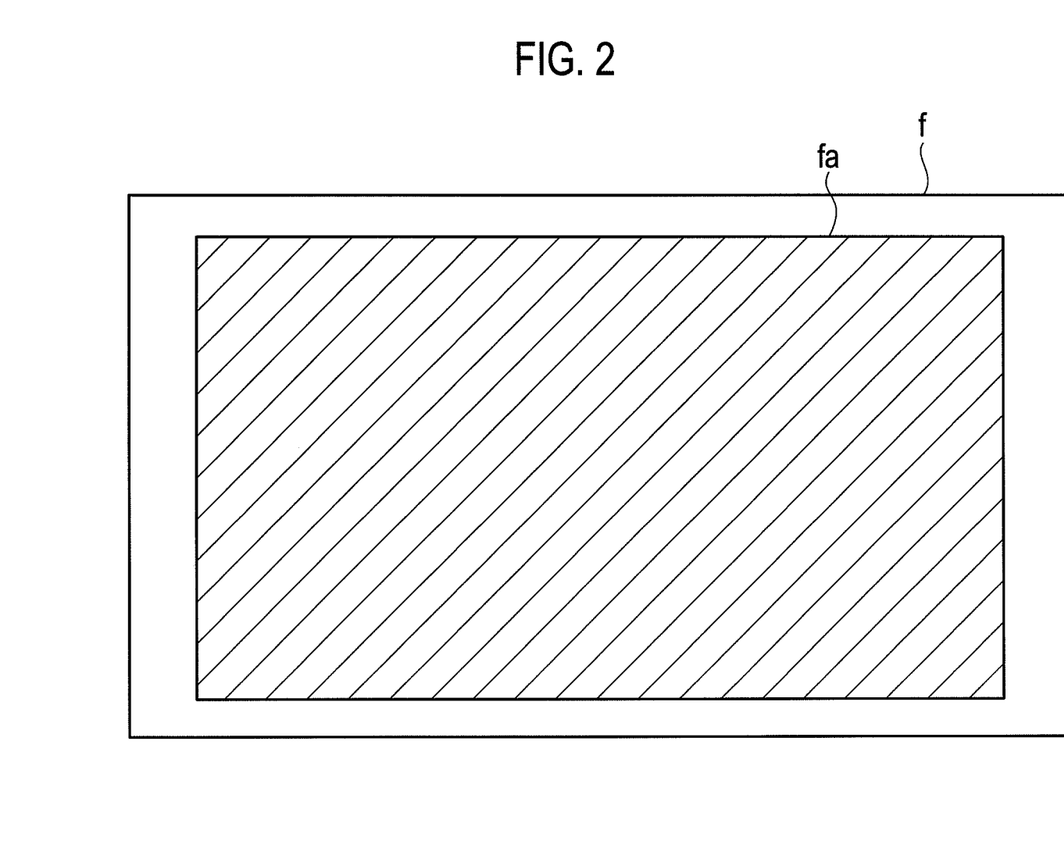
FIG. 2 is an explanatory diagram showing a predetermined discrimination region when a depth signal histogram generator shown in FIG. 1 generates depth signal histogram data.

FIG. 2 is an explanatory diagram showing a predetermined detection region fa which is provided in an image f within one field or one frame in a video image signal, wherein the depth signal histogram generator 12 generates depth signal histogram data based on one field or one frame.

The depth signal histogram generator 12, as shown in FIG. 2, provides the predetermined detection region fa in the image f within one field or one frame in the video image signal, and generates the depth signal histogram data according to the depth signal within the detection region fa.

Note that, while, in the present embodiment, the depth signal histogram data is generated for each one field or one frame, the depth signal histogram data may be generated for a plurality of fields or frames, that is, the depth signal histogram data may be generated for each predetermined unit (temporal unit) of a screen. However, the depth signal histogram data is preferably generated for each one field or one frame. Further, the detection region fa may have an optional size if provided within an effective video image period.

Figure 3:
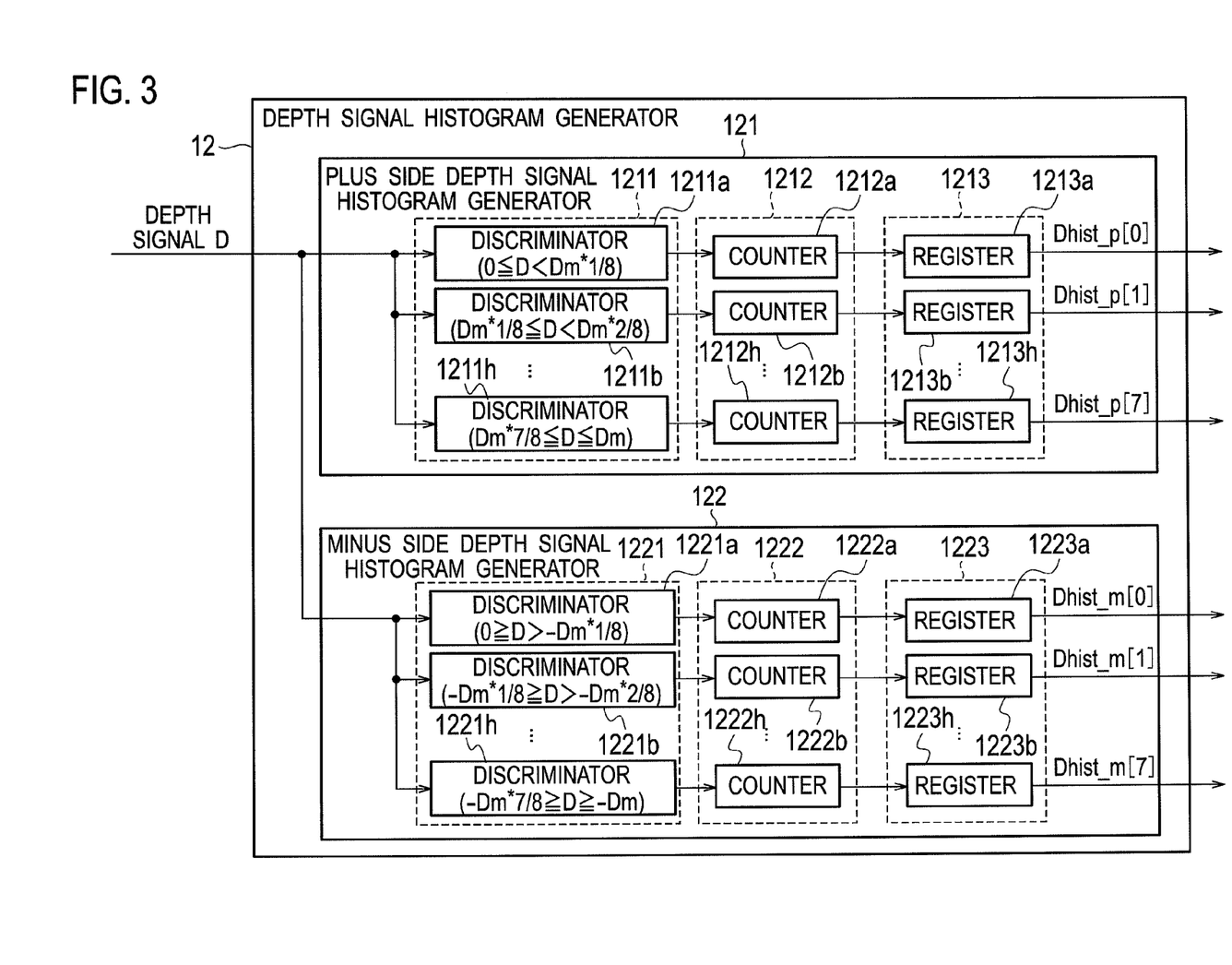
FIG. 3 is a block diagram showing a configuration example of the depth signal histogram generator shown in FIG. 1.

FIG. 3 is a block diagram showing a configuration example of the depth signal histogram generator 12 shown in FIG. 1.

As shown in FIG. 3, the depth signal histogram generator 12 is provided with a plus side depth signal histogram generator 121 and a minus side depth signal histogram generator 122. The plus side depth signal histogram generator 121 and the minus side depth signal histogram generator 122 include discriminator groups 1211 and 1221, counter groups 1212 and 1222, and register groups 1213 and 1223, respectively.

The depth signal D from the depth signal estimation unit 11 is output to the discriminator group 1211 of the plus side depth signal histogram generator 121 and the discriminator group 1221 of the minus side depth signal histogram generator 122 in the depth signal histogram generator 12.

Next, operation of the plus side depth signal histogram generator 121 will be explained.

The depth signal D input from the depth signal estimation unit 11 is input as an integer value within a range of $-Dm \le D \le Dm$ and supplied to discriminators 1211a to 1211h constituting the discriminator group 1211. Note that, Dm is an optional value determined by a depth estimation gain value in the depth signal estimation unit 11. The discriminator 1211a detects the depth signal D within a depth signal level region having a depth signal level of $0 \le D < (1/8)$ Dm. The discriminator 1211b detects the depth signal D within a depth signal level region having a depth signal level of $(1/8)Dm \le D < (2/8)Dm$. The discriminator 1211c detects the depth signal D within a depth signal level region having a depth signal level of $(2/8)Dm \le D < (3/8)Dm$. The discriminator 1211d detects the depth signal D within a depth signal level region having a depth signal level of $(3/8)Dm \le D < (4/8)Dm$. The discriminator 1211e detects the depth signal D in a depth signal level region having a depth signal level of $(4/8)Dm \le D < (5/8)Dm$. The discriminator 1211f detects the depth signal D within a depth signal level region having a depth signal level of $(5/8)Dm \le D < (6/8)Dm$. The discriminator 1211g detects the depth signal D within a depth signal level region having a depth signal level of $(6/8)Dm \le D < (7/8)$ Dm. The discriminator 1211h detects the depth signal D within a depth signal level region having a depth signal level of $(7/8)Dm \le D \le Dm$.

The discriminator group 1211 divides a range of the depth signal level which the input depth signal D can have, into the plural depth signal level regions and determines which depth signal level region includes a depth signal level of the depth signal D in a pixel unit. The discriminator group 1211 is provided with at least the same number of discriminators as the number of the depth signal level regions. In the present embodiment, the discriminator group 1211 is constituted by the eight discriminators 1211a to 1211h, and divides the range of the depth signal level which the depth signal D can have, into eight equal parts to obtain eight depth signal level regions, and determines which depth signal level region includes a depth signal level of the depth signal D in the pixel unit.

Moreover, in the present embodiment, a range of the depth signal level which the input depth signal D can have on the plus side is defined as $D \le Dm$, and this range $D \le Dm$ is divided into the eight depth signal level regions [0] to [7]. For example, when a pixel has a depth signal level of $(1/16)Dm$, "1" is output from the discriminator 1211a and "0" is output from each of the discriminators 1211b to 1211h. Note that, while, in the present embodiment, the number of discriminators included in the discriminator group 1211 is assumed to be eight and the depth signal level region is divided into eight equal parts, the present invention is not limited to this case.

The counter group 1212 is constituted by eight counters 1212a to 1212h. Each of the counters 1212a to 1212h counts up the signal output from each of the respectively corresponding discriminators 1211a to 1211h, and increments the count value by one. This count value expresses a total number of pixels included in each depth signal level region divided by the discriminator group 1211.

The register group 1213 is constituted by eight registers 1213a to 1213h. The registers 1213a to 1213h retain the count values output from the respectively corresponding counters 1212a to 1212h and output the count values as the depth signal histogram data Dhist_p[0] to Dhist_p[7] (Dhist_p[i], i=0 to 7).

In this manner, the plus side depth signal histogram generator 121 counts the number of pixels included in each of the eight divided plus side depth signal level regions [0] to [7], and generates the depth signal histogram data Dhist_p[i] which shows a depth signal level distribution in each depth signal level region, according to the count values, and supplies this data to the depth signal level converter 13.

Note that, the minus side depth signal histogram generator 122 is also constituted in the same way as the plus side depth signal histogram generator 121, and the discriminator group 1221 includes eight discriminators 1221a to 1221h, the counter group 1222 includes eight counters 1222a to 1222h, and the register group 1223 includes eight registers 1223a to 1223h. The minus side depth signal histogram generator 122 operates in the same way as the plus side depth signal histogram generator 121, and generates minus side depth signal histogram data Dhist_m[0] to Dhist_m[7] (Dhist_m[i], i=0 to 7) and supplies this data to the depth signal level converter 13.

(Operation of the Depth Signal Level Converter 13)

Next, operation of the depth signal level converter 13 will be explained with reference to a flowchart.

Figure 4:
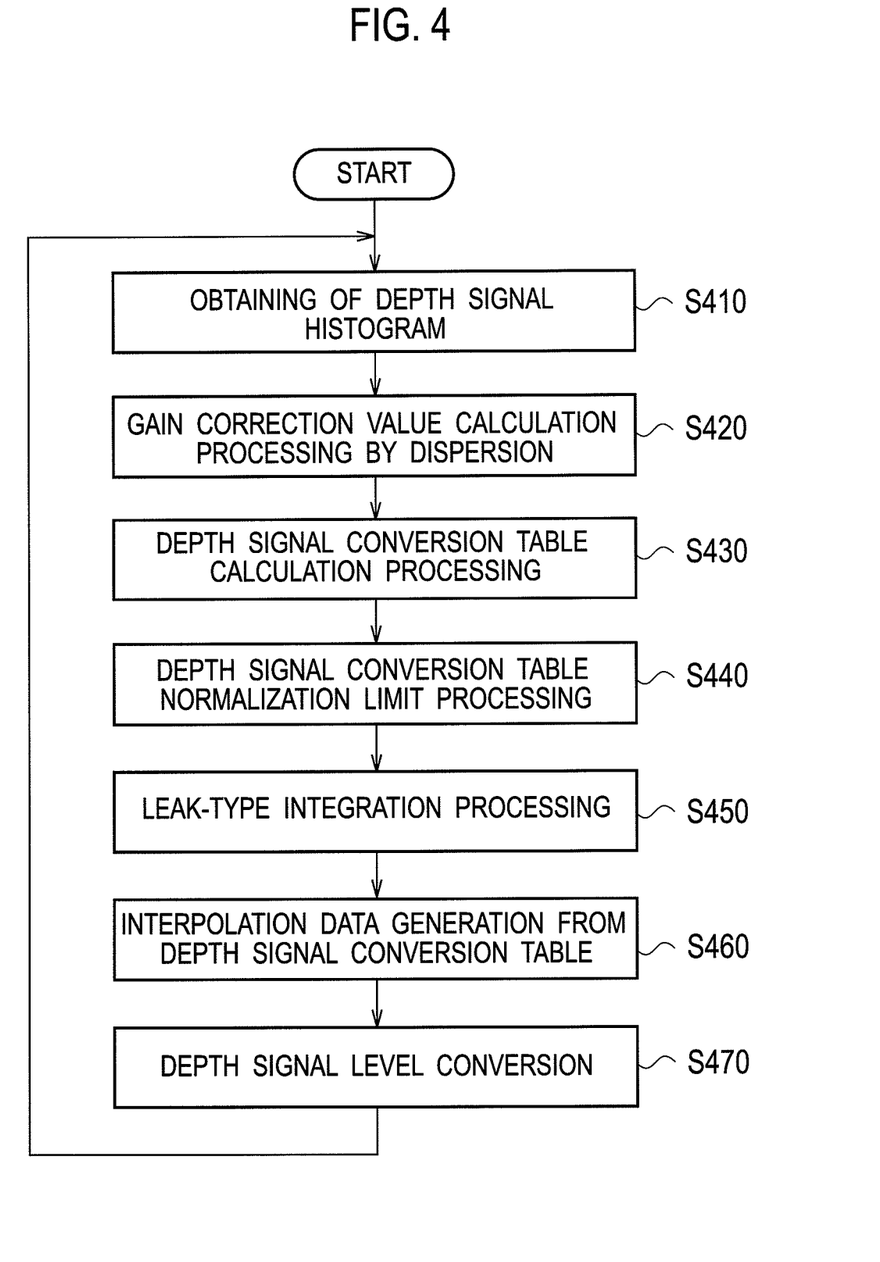
FIG. 4 is a flowchart showing an example of processing in a depth signal level converter shown in FIG. 1.

FIG. 4 is a flowchart showing an example of processing in the depth signal level converter 13.

First, the depth signal level converter 13 obtains the depth signal histogram data Dhist_p[i] and Dhist_m[i] from the depth signal histogram generator 12 (step S410).

Next, the depth signal level converter 13 calculates a dispersion value using the depth signal histogram data obtained from the depth signal histogram generator 12, and performs processing of calculating a gain correction value according to the dispersion value (step S420). Detailed sequence of step S420 will be described in detail in FIG. 6.

Subsequently, the depth signal level converter 13 performs integration processing and normalization processing using the depth signal histogram data which has been used in the gain correction value calculation processing according to the dispersion value, and performs processing of calculating a depth signal conversion table (step S430). Detailed sequence of step S430 will be described in detail in FIG. 7.

Next, the depth signal level converter 13 performs normalization limit processing of the depth signal conversion table (step S440), and successively performs leak-type integration processing in the temporal direction (step S450). Details of the normalization limit processing in step S440 and the leak-type integration processing in step S450 will be described below. Note that these processing steps may be omitted.

Subsequently, the depth signal level converter 13 generates interpolation data between points for generating the depth signal level conversion curve, according to the points stored in the calculated depth signal conversion table for generating the depth signal level conversion curve (step S460).

Then, the depth signal level converter 13 calculates a depth signal after level conversion Dconv by providing level conversion for the depth signal D according to the depth signal level conversion curve (step S470).

Note that, after step S470 has been finished, the depth signal level converter 13 returns to step S410 and repeats the processing from step S410 to step S470.

Figure 5:
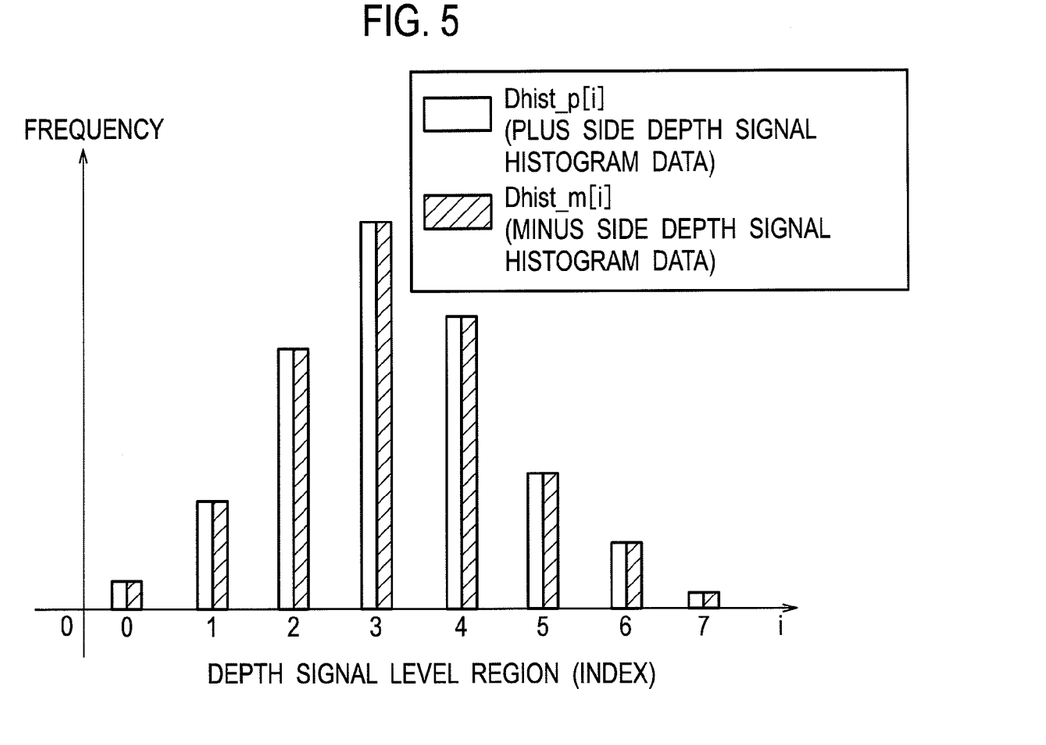
FIG. 5 is an explanatory diagram showing an example of depth signal histogram data according to the embodiment of the present invention.

FIG. 5 is an explanatory diagram showing an example of the depth signal histogram data generated by the depth signal histogram generator 12.

In FIG. 5, the horizontal axis expresses the eight depth signal level regions (index i, i=0 to 7) and the vertical axis expresses a frequency which is a count value of the number of pixels included in each of the depth signal level regions.

The processing contents of the depth signal level converter 13 shown in FIG. 4 will be explained again for an example of the case that the plus side depth signal histogram data Dhist_p[i] and the minus side depth signal histogram data Dhist_m[i] respectively having peaks on the plus (p) side and the minus (m) side, are input, as shown in FIG. 5. Note that, since the depth signal level converter 13 performs the same processing independently in the plus region and the minus region of the depth signal as shown in FIG. 4, the processing contents in the plus region will be explained here representatively.

In step S410, the depth signal level converter 13 obtains the plus side depth signal histogram data Dhist_p[i] which is output from the depth signal histogram generator 12.

(Gain Correction Value Calculation Processing of Step S420 shown in FIG. 4)

In step S420, the depth signal level converter 13 obtains an average value Dhist_p_Ave of the plus side depth signal histogram data Dhist_p[i] by the following equation (1) using the plus side depth signal histogram data Dhist_p[i] obtained in step S410.

$$\text{Dhist\_p\_Ave} = \left(\sum_{i=0}^{7} \text{Dhist\_p}[i]\right) / 8 \qquad (1)$$

Next, the depth signal level converter 13 obtains a dispersion value SS of the plus side depth signal histogram data Dhist_p[i] by the following equation (2), $$SS = \sum_{i=0}^{7} \{\text{abs}(\text{Dhist\_p}[i] - \text{Dhist\_p\_Ave}) \times 8 / \text{Dhist\_p\_Ave}\} \qquad (2)$$

where "abs" means an absolute value.

The dispersion value SS shown in the equation (2) takes a large value when the depth signal histogram data Dhist_p[i] is concentrated on a specific index i, whereas it takes a small value when the depth signal histogram data Dhist_p[i] is dispersed among a plurality of indexes i.

Figure 6:
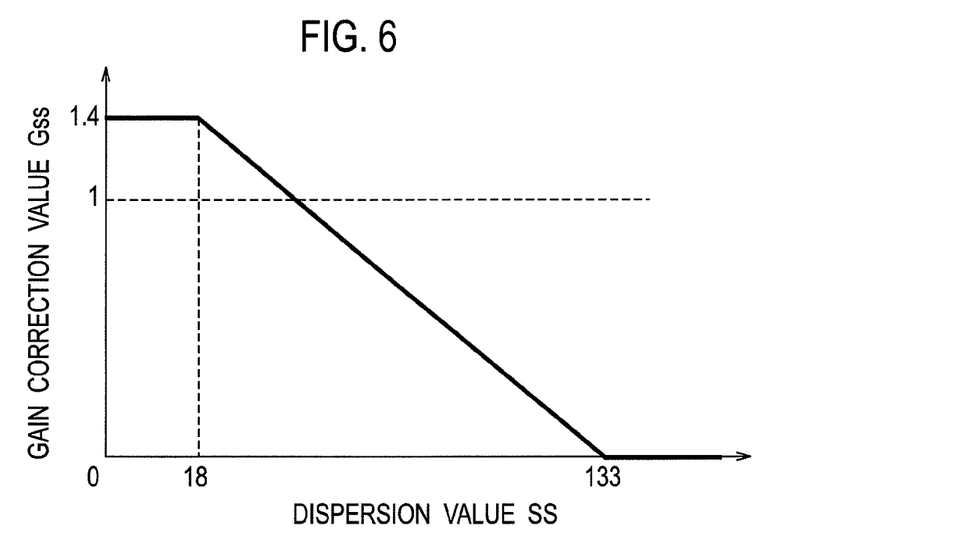
FIG. 6 is a diagram showing an example of a relationship between a dispersion value SS of depth signal histogram data and a gain correction value Gss according to the embodiment of the present invention.

FIG. 6 is a diagram showing an example of a relationship between the dispersion value SS of the depth signal histogram data and a gain correction value Gss in the present embodiment. In FIG. 6, the horizontal axis expresses the dispersion value SS in the equation (2) and the vertical axis expresses the gain correction value Gss. As shown in FIG. 6, for example, when the dispersion value SS is small as 0 to 18, that is, when the depth signal histogram data Dhist_p[i] is dispersed among the plurality of indexes i, the gain correction value Gss is set to be 1.4.

In a range of 18 to 133 for the dispersion value SS, as the dispersion value SS becomes larger, the gain correction value Gss is set to be smaller. That is, as the depth signal histogram data Dhist_p[i] is concentrated on a specific index i in a higher degree, the gain correction value Gss is set to be smaller.

When the dispersion value SS becomes equal to or larger than 133, the depth signal histogram data Dhist_p[i] is assumed to be concentrated only on a specific index i and the gain correction value Gss is set to be zero. In the present embodiment, the dispersion value SS is assumed to have the characteristic of taking a smaller value as dispersion of the histogram data becomes larger. The present invention is not however limited to this case. The dispersion value SS may have a characteristic of taking a larger value as the dispersion of the histogram data becomes larger.

Note that, the gain correction value Gss is assumed to have change points at dispersion values SS of 18 and 133 in the example shown in FIG. 6. The present invention is not however limited to this case. The change point of the gain correction value Gss may be set optionally. While the gain is assumed to be zero at a dispersion value SS of 133 or larger in the example shown in FIG. 6, the gain may not be zero.

In this manner, in the present embodiment, when the dispersion value SS shown by the equation (2) is small, that is, when the depth signal histogram data Dhist_p[i] is dispersed, the gain correction value Gss is set to be larger and gradation of the depth signal is expanded. When the dispersion value SS is small, a shift of the point Q[i] in the depth signal conversion table which is generated in step S430 to be described below, from a linear curve becomes small, and therefore the gain correction value Gss is set to be larger and it is suppressed that the shift becomes too small. On the other hand, as the dispersion value SS becomes larger, that is, as the depth signal histogram data Dhist_p[i] is more concentrated on a specific index i, the gain correction value Gss is set to be smaller and the gradation of the depth signal is decreased. That is, when the dispersion value SS is large, the shift of the point Q[i] in the depth signal conversion table from the linear curve becomes too large, and therefore the gain correction value Gss is set to be smaller and it is suppressed that the shift becomes too large. By the present processing, the shift of the point Q[i] in the depth signal conversion table from the linear curve comes to have a value in a certain range whatever distribution the depth signal histogram data Dhist_p[i] has. (Depth Signal Conversion Table Calculation Processing of Step S430 Shown in FIG. 4)

Figure 7:
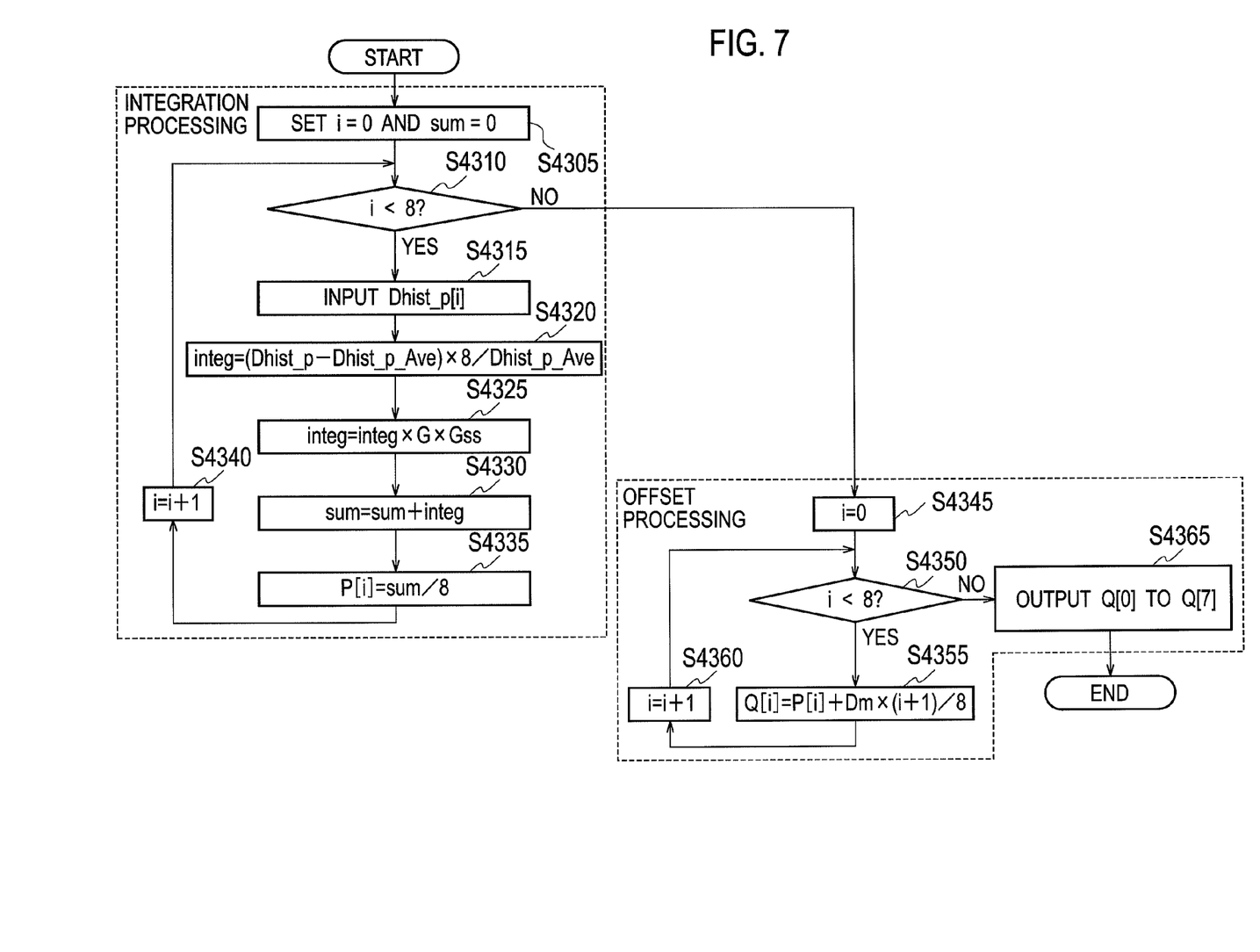
FIG. 7 is a flowchart showing a detailed processing sequence of depth signal conversion table calculation processing according to the embodiment of the present invention.

FIG. 7 is a flowchart showing a detailed processing sequence of the depth signal conversion table calculation processing of step S430 shown in FIG. 4.

The depth signal level converter 13 generates a value of the depth signal conversion table for the level conversion of the input depth signal, that is, the point Q[i] (i=0 to 7) of the depth signal conversion table for generating the depth signal level conversion curve, using the plus side depth signal histogram data Dhist_p[i] and the gain correction value Gss.

The depth signal conversion table calculation processing in the depth signal level converter 13 is broadly divided into integration processing and offset processing. The integration processing corresponds to steps S4305 to S4340, and the offset processing corresponds to steps S4345 to S4365 in FIG. 7.

In the integration processing, the depth signal level converter 13 generates a point P[i] (i=0 to 7) expressing a shift amount of each point in the depth signal conversion table for generating the depth signal level conversion curve, from the linear curve. In the offset processing, the depth signal level converter 13 performs the offset processing by superimposing a linear curve component on P[i] (i=0 to 7) to generate the point Q[i] (i=0 to 7) of the depth signal conversion table for generating the depth signal level conversion curve.

Specifically, first, the depth signal level converter 13 sets each of the variable i and an integration value sum of the point P[i] to be zero (step S4305).

Next, the depth signal level converter 13 determines whether or not i is smaller than eight which is the number of divisions in the depth signal level regions (step S4310). When i is smaller than eight ("YES" in step S4310), the process goes to processing in step S4315, and on the other hand, when i is equal to or larger than eight ("NO" in step S4310), the process goes to processing in step S4345.

That is, the depth signal level converter 13 inputs the plus side depth signal histogram data Dhist_p[i] when i is smaller than eight ("YES" in step S4310) (step S4315). Here, initially the plus side depth signal histogram data is Dhist_p[0] by the processing of i=0 in step S4305.

Next, the depth signal level converter 13 offsets the plus side depth signal histogram data Dhist_p[i] input in step S4315 by a calculation equation shown in the following equation (3) using the average value Dhist_p_Ave of the Dhist_p [i] (i=0 to 7) (step S4320). The calculated value integ in step S4320 is an offset value.

$$integ=(Dhist\_p[i]-Dhist\_p\_Ave) \times 8/Dhist\_p\_Ave \quad (3)$$

Next, the depth signal level converter 13, as shown in the following equation (4), multiplies the offset value integ in the equation (3) obtained in step S4320 by a predetermined fixed gain G and the gain correction value Gss which is obtained from the dispersion value SS by the relationship shown in FIG. 6 (step S4325). The fixed gain G is an optional gain value set in the depth signal level converter 13 or the like.

$$integ=integ \times G \times Gss \quad (4)$$

Subsequently, the depth signal level converter 13 adds the offset value integ which is expressed by the equation (4) and obtained in step S4325, to the integration value sum of the point P[i] (step S4330). Initially the integration value sum is zero by the processing of i=0 in step S4305, thereby a newly obtained integration value sum becomes the data obtained in step S4330.

Next, the depth signal level converter 13 obtains the point P[i] corresponding to the plus side depth signal histogram data Dhist_p[i] by the following equation (5) using the integration value sum obtained in step S4330 (step S4335).

$$P[i]=sum/8 \quad (5)$$

Where P[i] obtained by the equation (5) is retained temporarily in a memory (not shown in the drawing) within the depth signal level converter 13.

Then, after the processing of step S4335 has been finished, the depth signal level converter 13 increments i by one (step S4340) and returns to the processing of step S4310. Then, the depth signal level converter 13 repeats the processing of the above-described steps S4310 to S4340 until i becomes seven.

The depth signal level converter 13, generates the point P[i] (i=0 to 7) which expresses a shift value at each of the points in the depth signal conversion table for generating the depth signal level conversion curve from the linear curve, by the above processing. The processing up to this step is the integration processing in the depth signal conversion table calculation processing of step S430.

In this manner, for the point P[i] (i=0 to 7), the depth signal level converter 13 multiplies the offset value integ by the fixed gain G and the gain correction value Gss which is obtained by the dispersion value SS of the relationship shown in FIG. 6, using the equation (4). Thereby, the depth signal level converter 13 can generate the depth signal conversion table so as to expand the gradation of the depth signal by increasing the gain correction value Gss in the vicinity of the depth signal level where the dispersion value SS is small and the depth signal histogram data is dispersed among the plurality of depth signal level regions. On the other hand, the depth signal level converter 13 can generate the depth signal conversion table so as to shrink the gradation of the depth signal by decreasing the gain correction value Gss in the vicinity of the depth signal level where the dispersion value SS is large and the depth signal histogram data is concentrated on a specific depth signal level region.

Next, the depth signal level converter 13 performs the offset processing by superimposing the linear curve component on P[i] (i=0 to 7).

When P[7] is obtained by the processing of step 4335 in FIG. 7, the depth signal level converter 13 increments i by one in the processing of step S4340. As a result, i becomes eight.

Then, the depth signal level converter 13 determines that i is not smaller than eight in the determination processing of step S4310 ("NO" in step S4310), and goes to the processing of step S4345 and sets i to be zero again (step S4345).

In addition, the depth signal level converter 13 determines whether i is smaller than eight or not (S4350). When i is smaller than eight ("YES" in step S4350), the depth signal level converter 13 goes to processing of step S4355. On the other hand, when i is equal to or larger than eight ("NO" in step S4350), the depth signal level converter 13 goes to the processing of step S4365.

When i is smaller than eight ("YES" in step S4350), the depth signal level converter 13 generates the point Q[i] of the depth signal conversion table for generating the signal level conversion curve by adding each point P [i] and the linear curve component corresponding to the point P [i] using the following equation (6) (step S4355).

$$Q[i]=P[i]+Dm\times(i+1)/8 \quad (6)$$

Where the points Q[i] obtained by the equation (6) are retained temporarily in a memory, not shown in the drawing, within the depth signal level converter 13.

Then, after the processing of step S4355 has been finished, the depth signal level converter 13 increments i by one (step S4360) and returns to the determination processing of step S4350. That is, the depth signal level converter 13 executes the depth signal level change correction processing of step S4355 repeatedly until i becomes seven.

After Q[7] has been generated in step S4355 and i has been incremented by one to eight in the processing of step S4360, then the depth signal level converter 13 determines that i is not smaller than eight in step S4350 ("NO" in step S4350), and goes to processing of step S4365 to output the values of the respective points Q[0] to Q[7] (step S4365).

By the above processing, the depth signal level converter 13 outputs the points Q[i] (i=0 to 7) of the depth signal conversion table for generating the signal level conversion curve.

The above description shows the details of the depth signal conversion table calculation processing of step S430 in FIG. 4.

Figure 8:
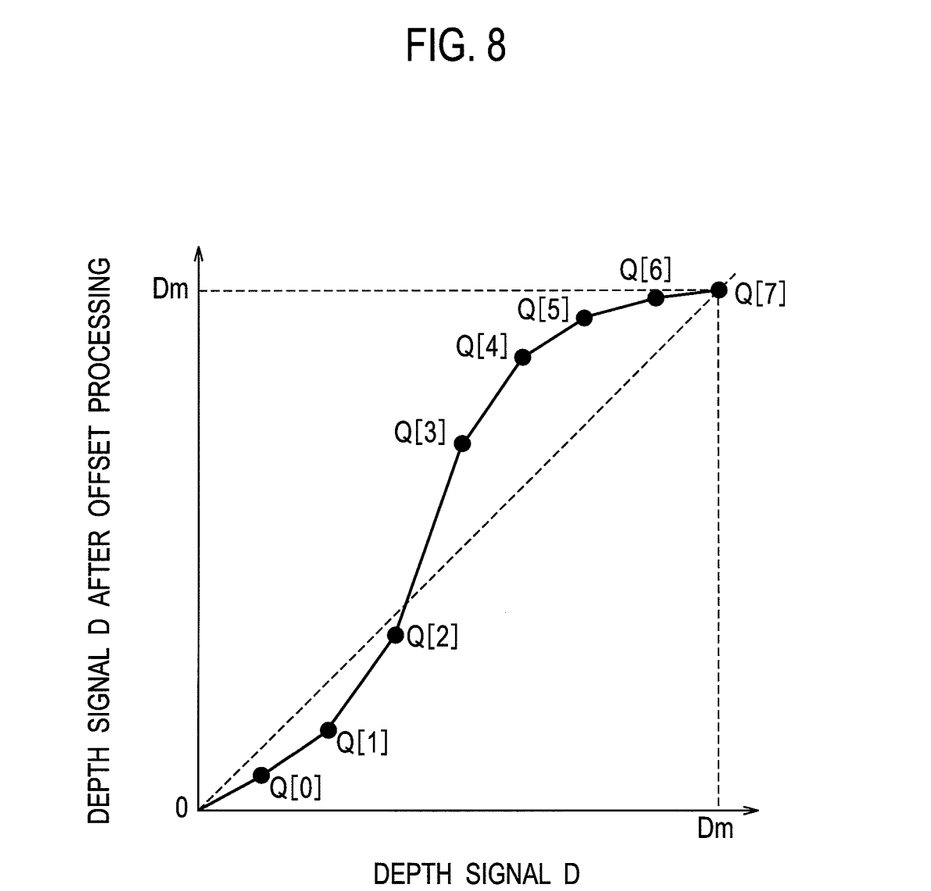
FIG. 8 is a diagram showing an example of points Q[i] (i=0 to 7) according to the embodiment of the present invention.

An example of the point Q[i] obtained by this depth signal conversion table calculation processing is shown in FIG. 8. In FIG. 8, the horizontal axis expresses the depth signal D input from the depth signal estimation unit 11 and the vertical axis expresses the depth signal D through the offset processing. The conversion curve for level converting the depth signal D is generated by the points Q[0] to Q[7].

(Normalization Limit Processing of Step S440 Shown in FIG. 4)

In step S440, the depth signal level converter 13 performs normalization limit processing for the point Q[i] of the depth signal conversion table obtained in step S430.

Figure 9:
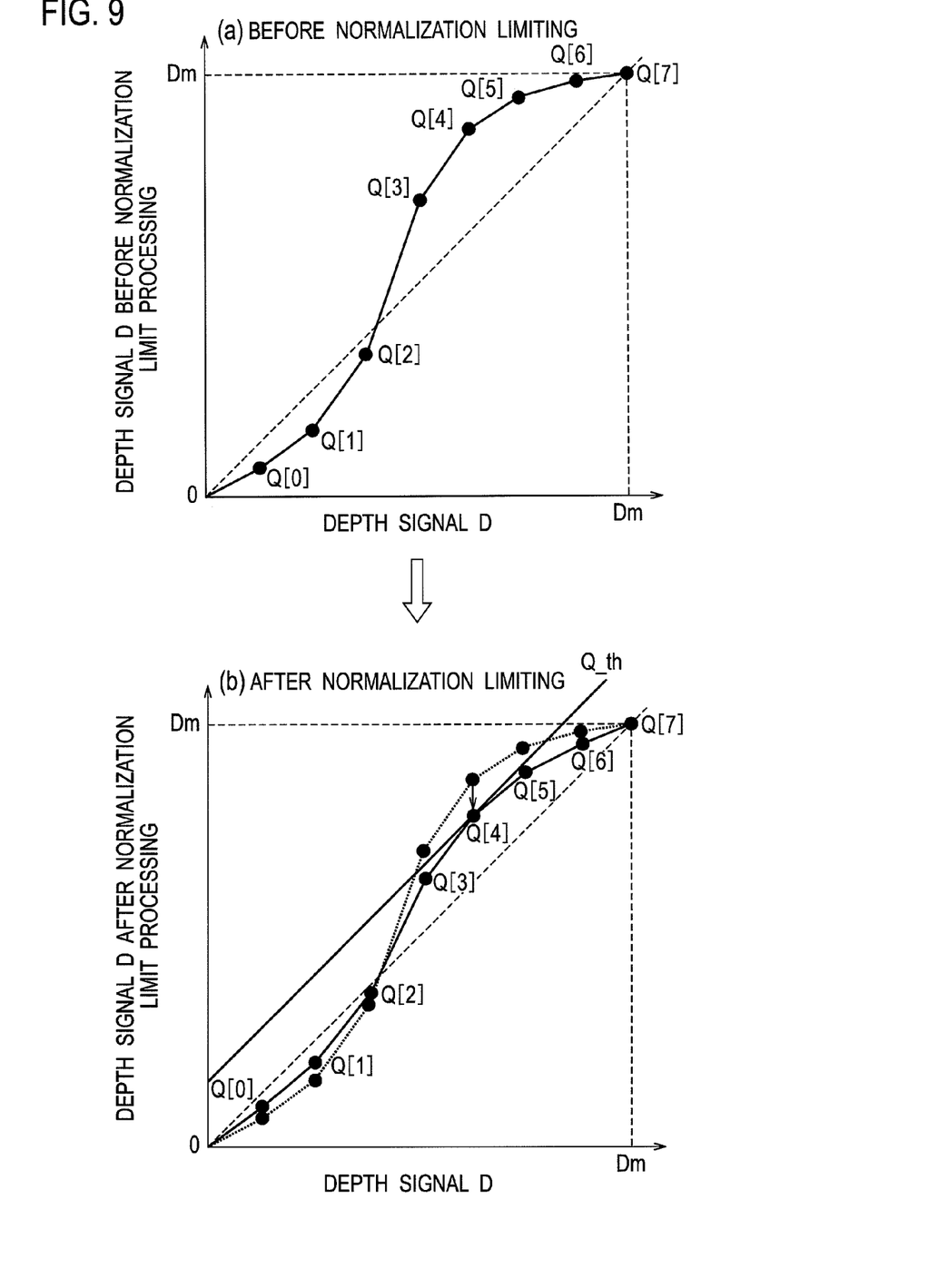
FIG. 9 is an explanatory diagram of normalization limit processing for points Q[i] (i=0 to 7) according to the embodiment of the present invention.

FIG. 9 is an explanatory diagram showing an example of the normalization limit processing for Q[i]. FIG. 9(a) shows the each of points Q[0] to Q[7] before the normalization limit processing, and FIG. 9(b) shows the each of points Q[0] to Q[7] after the normalization limit processing.

The depth signal level converter 13 first calculates a difference value Qsub[i] between Q[i] (each of the points Q[0] to Q[7]) and linear data [Dm×(i+1)/8] using the following equation (7).

$$Q\text{sub}[i]=Q[i]-[Dm\times(i+1)/8] \quad (7)$$

Where i=0 to 7, the absolute value of Qsub[i] is denoted by Qsub_abs [i] and the maximum value of Qsub_abs [i] (i=0 to 7) is denoted by Qsub_max.

Moreover, when a limit threshold value is denoted by Q_th and Qsub_max is larger than Q_th, the depth signal level converter 13 performs normalization limiting using the following equation (8) to correct Qsub[i] (i=0 to 7).

$$Q\text{sub}[i]=Q\text{sub}[i]\times Q\_th/Q\text{sub}\_\max \quad (8)$$

After that, the depth signal level converter 13 obtains a sum of Qsub[i] and the linear data to generate Q[i] after the correction, using the following equation (9), and goes to processing of step S450.

$$Q[i]=Q\text{sub}[i]+[Dm\times(i+1)/8] \quad (9)$$

(Leak-Type Integration Processing of Step S450 Shown in FIG. 4)

Figure 10:
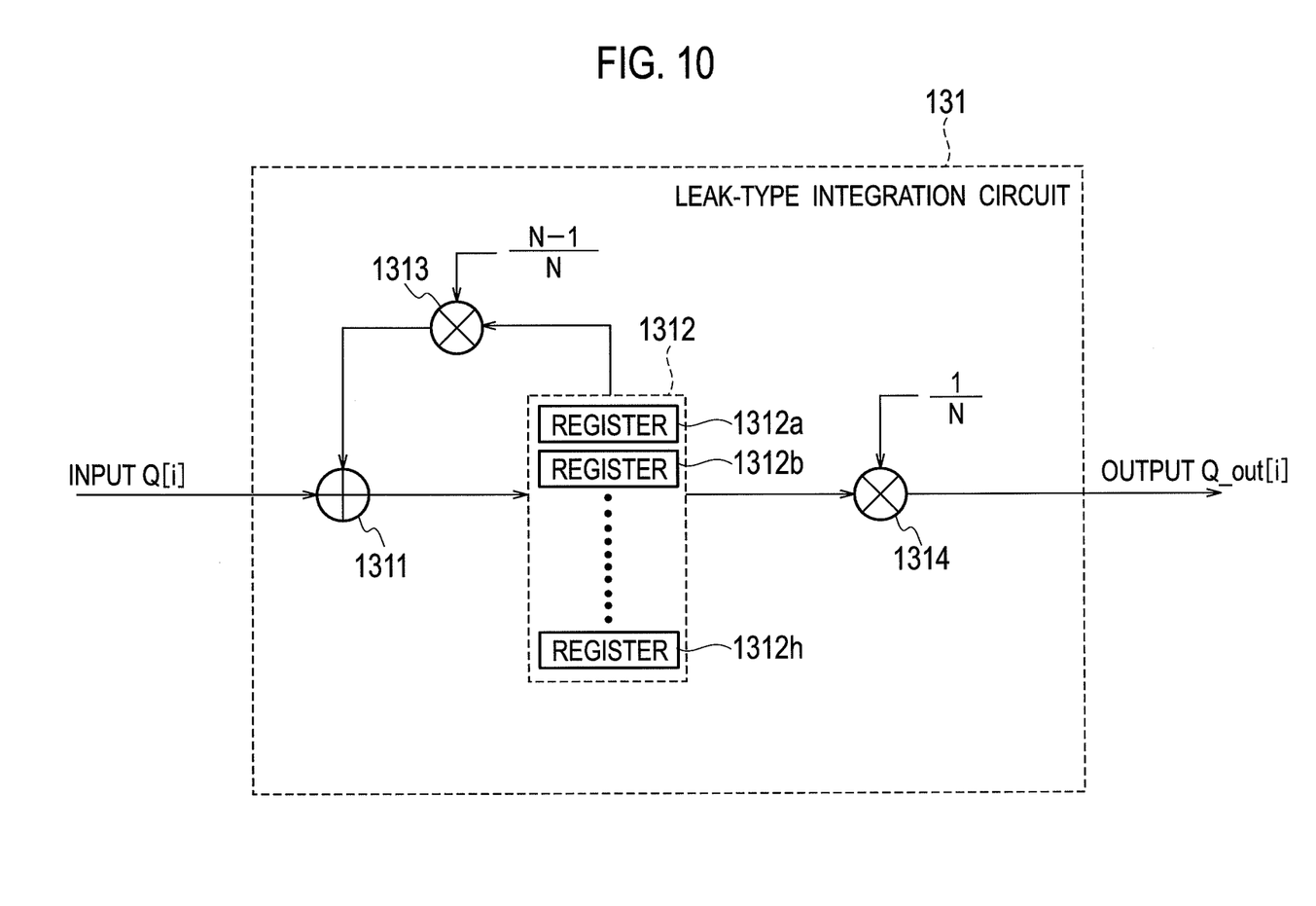
FIG. 10 is a block diagram showing a configuration example of a leak-type integration circuit according to the embodiment of the present invention.

In step S450, the depth signal level converter 13, using Q[i] subject to the normalization limit processing in step S440 (point after the limit processing) as an input, sets output data which has passed through a leak-type integration circuit configured as shown in FIG. 10, for example, as final output data Q_out [i].

FIG. 10 is a block diagram showing a configuration example of the leak-type integration circuit for executing the leak-type integration processing of step S450 shown in FIG. 4. The leak type integration circuit 131 is included in the depth signal level converter 13.

The leak-type integration circuit 131 shown in FIG. 10 includes an adder 1311, a register group 1312, a multiplier 1313, and a multiplier 1314, and is configured so as to perform the leak-type integration processing in the temporal direction.

The register group 1312 includes eight registers 1312a to 1312h for retaining leak integration results of the respective points Q[0] to Q[7]. The registers 1312a to 1312h correspond to respective points Q[0] to Q[7] in this order.

In the leak-type integration circuit 131, when the point Q[i] is input, data is output only from the register corresponding to the point Q[i] among the eight registers 1312a to 1312h within the register group 1312. The multiplier 1313 multiplies the data by (N−1)/N (N is an integer equal to or larger than 1). The adder 1311 adds the multiplied data from the multiplier 1313 to the input Q[i] to output the result.

This added result is stored again in the register corresponding to the point Q[i] within the register group 1312.

Then, the leak-type integration circuit 131 outputs what the multiplier 1314 has multiplied the data output from the register corresponding to Q[i] within the register group 1312 by 1/N as a final output data Q_out[i]. As this processing is performed sequentially for each of the points Q[0] to Q[7], the final output data Q_out[0] to Q_out[7] are obtained for the respective points Q[i].

As described above, the depth signal level converter 13 outputs the final output data (point after the integration processing) Q_out[i] with gradually changing each of the points Q[i] generating the depth signal level conversion curve by performing the leak-type integration processing, thereby can perform more natural depth signal level conversion.

(Interpolation Data Generation Processing of Step S460 Shown in FIG. 4)

Figure 11:
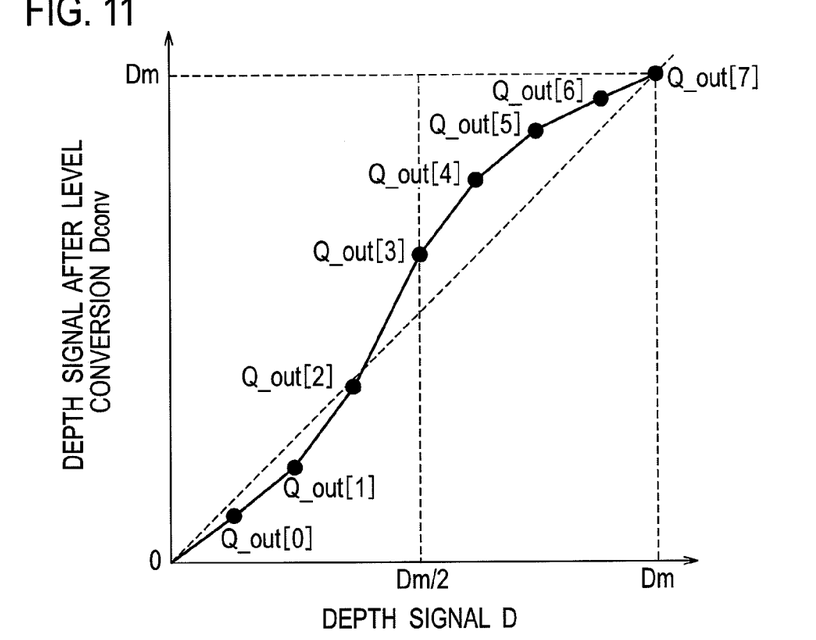
FIG. 11 is a diagram showing an example of a depth signal level conversion curve which is generated for a plus region of a depth signal according to the embodiment of the present invention.

In step S460, the depth signal level converter 13 generates a depth signal level conversion curve with linear interpolation based on the final output data Q_out[i] (i=0 to 7) obtained in step S450, as shown in FIG. 11.

(Level Conversion Processing of Step S470 Shown in FIG. 4)

By level conversion processing of step S470, the depth signal level converter 13 provides level conversion for the depth signal D of the input signal according to the depth signal level conversion curve which is provided with the linear interpolation by the processing of step S460 and outputs the result as a depth signal after level conversion Dconv.

By the above processing, the depth signal level converter 13 executes the depth signal level conversion processing in the depth signal plus region.

Figure 12:
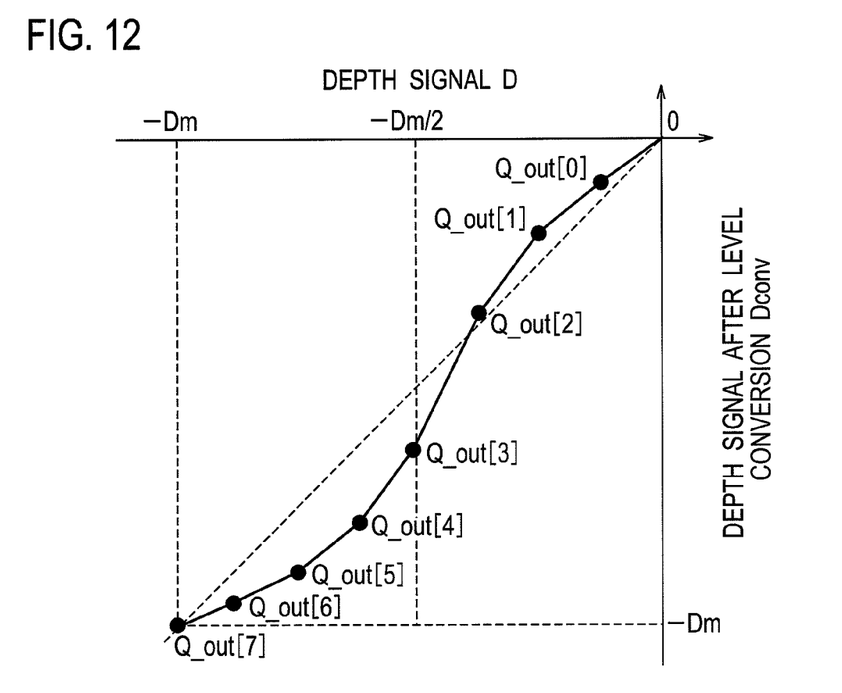
FIG. 12 is a diagram showing an example of a depth signal level conversion curve which is generated for a minus region of a depth signal according to the embodiment of the present invention.

Note that the depth signal level converter 13, in the depth signal minus region as in the plus region, generates a depth signal level conversion curve as shown in FIG. 12 by the processing of steps S410 to S460, performs the level conversion for the depth signal D of the input signal by the succeeding processing of S470, and outputs the result as the depth signal after level conversion Dconv.

By the above processing, the depth signal level converter 13 provides the level conversion for the depth signal D of the input image which has a linear characteristic originally in each of the depth signal plus region and minus region, according to the depth signal level conversion curve. Then, the depth signal level converter 13 outputs the depth signal after level conversion Dconv as a final image shift signal.

As explained above, the depth signal generation apparatus 1 of the present embodiment expands the gradation of the depth signal in the vicinity of the depth signal level where the depth signal histogram data is dispersed among the plurality of depth signal level regions, and shrinks the gradation of the depth signal in the vicinity of the depth signal level where the depth signal histogram data is concentrated on the specific depth signal level region. In this manner, the depth signal generation apparatus 1 modulates the depth signal of the input image. Thereby, the depth signal generation apparatus 1 can allocate gradations (gain) in the depth direction to the depth signal levels occupying a large area in the input image (viewing field) within the limited depth signal range, thereby can improve the pseudo stereoscopic effect even when the gain is weaken in the depth signal estimation. As a result, according to the depth signal generation apparatus 1, it becomes possible to obtain a pseudo stereo image providing an excellent stereoscopic effect without causing uncomfortable feeling, from a non-stereo image.

Note that, while the depth signal generation apparatus of the present embodiment is explained to generate the depth signal conversion table by changing the gain correction value Gss according to the dispersion value SS obtained by the equation (2) as shown in FIG. 6, the present invention is not limited to this case. The depth signal generation apparatus may obviously generate the depth signal conversion table by changing the gain correction value Gss according to a parameter except the dispersion value SS.

(Operation Example of the Stereo Pair Generation Apparatus 2)

The stereo pair generation apparatus 2 generates an image having a different viewing point using the depth signal after level conversion Dconv in which the depth signal D is provided with the level conversion, according to the depth signal level conversion curve generated by the depth signal generation apparatus 1, and using the video image. For example, when a viewing point is moved to the left, what displays at the front of a screen is nearer to an observer, looking the more inside (nose side) of the observer, therefore a texture of the corresponding part is moved to the inside, that is, to the right side by an amount according to the depth. On the other hand, what displays at the back of the screen is nearer to an observer, looking the more outside of the observer, therefore a texture of the corresponding part is moved to the left by an amount according to the depth. The image having a different viewing point generated in this manner is used as a left eye image and the original image is used as a right eye image to compose a stereo pair.

That is, in the stereo pair generation apparatus 2 shown in FIG. 1, first, in an order from the depth signal after level conversion Dconv having a smaller value, that is, the depth signal after level conversion located at a deeper position among the depth signals after level conversion Dconv, which are the depth data of the respective pixels and are output from the depth signal generation apparatus 1, a texture shifter 21 shifts a texture of the video image signal of a part corresponding to the depth value by the number of pixels corresponding to a value indicated by the depth signal after level conversion Dconv. When the depth signal after level conversion Dconv is negative, the texture is shifted to the left by the number of pixels corresponding to a value indicated by the depth signal after level conversion Dconv and, when positive, the texture is shifted to the right.

The shift operation of the texture in the video image signal according to the depth signal after level conversion Dconv in the texture shifter 21 corresponds to texture shift of the non-stereo image in the video signal. In other words, the shift operation of the texture is processing of moving each pixel of the non-stereo image to left or right respectively, according to the value of the depth signal after level conversion Dconv which is the depth data.

Here, by changing a positional relationship in the image through shifting, a part where a texture does not exist, that is, occlusion is generated. For such a part, an occlusion compensator 22 fills the part with a video image signal in a peripheral of the corresponding part of the video signal or fills the part by a method described in a publicly known document (Kunio Yamada, Kenji Mochizuki, Kiyoharu Aizawa, and Takahiro Saito; "Disocclusion Based on the Texture Statistics of the Image Segmented by the Region Competition Algorithm" ITE Journal, Vol. 56, No. 5, pp. 863-866 (2002.5)) or the like.

For the image provided with the occlusion compensation in the occlusion compensator 22, the post processor 23 reduces noise generated in the previous processing by providing post processing such as smoothing, and the left eye image signal generator 24 outputs the image as a left eye image signal, while the right eye image signal generator 25 outputs the video image signal as a right eye image signal.

In this manner, the stereo pair generation apparatus 2 can generate the stereo pair of the left eye image signal and the right eye image signal using the video image and the depth signal after level conversion Dconv which the depth signal D is provided with the level conversion according to the depth signal level conversion curve generated by the depth signal generation apparatus 1. These left eye image signal and right eye image signal are output to the stereo display apparatus 3.

The pseudo stereo image signal generation apparatus of the present embodiment is configured with the stereo pair generation apparatus 2 and the depth signal generation apparatus 1. By this pseudo stereo image signal generation apparatus, it becomes possible to generate the stereo pair from the non-stereo image and to display a pseudo stereo image providing an excellent stereoscopic effect without causing uncomfortable feeling, on the stereo display apparatus 3 using this stereo pair.

Note that the stereo pair may be configured with a left eye image signal of the original image and a right eye image signal of the image having a different viewing point by mirror reversing. Further, in the above-described processing, the stereo pair is configured that one of the right eye image signal and the left eye image signal is allocated for the video image signal and another is allocated for the image signal having a different viewing point. However, it is possible to configure the stereo pair using image signals having different viewing points for left and right. That is, it is possible to configure the stereo pair using an image signal having a different viewing point in which the viewing point is moved to the right and an image signal having a different viewing point in which the viewing point is moved to the left.

(Operation Example of the Stereo Display Apparatus 3)

The stereo display apparatus 3 shown in FIG. 1 is, for example, a projection system using polarization glasses, a projection system or display system configured with a combination of time division display and liquid crystal shutter glasses, a stereo display of a lenticular type, a stereo display of an anaglyph type, a head mount display, or a projector system configured with two projectors corresponding to respective images of a stereo image. The stereo display apparatus 3 displays a pseudo stereo image by inputting the left eye image and the right eye image generated by the stereo pair generation apparatus 2, on a display or the like.

Note that, while, in the above-described explanation, the stereo pair generation apparatus 2 is explained for the example of having the two viewing points for the left eye image signal and the right eye image signal, the present invention is not limited to this case. The stereo pair generation apparatus 2 obviously may be configured so as to generate images having different viewing points in a number according to the number of viewing points when display is performed by a display apparatus capable of displaying images having two or more viewing points.

Moreover, it is also possible to make a multi-viewing-point stereo image display system using a display apparatus capable of displaying images having two or more viewing points as described above. Further, the present stereo display system could have a configuration provided with an audio output. In this case, for an image content without having audio information such as a still image, there would be a mode in which environmental sound suitable for the image is added.

Moreover, in the present embodiment, as shown in FIG. 1, the depth signal generation apparatus 1, the stereo pair generation apparatus 2, and the stereo display apparatus 3 are explained to be configured by the hardware. However, the present invention is not limited to a configuration by the hardware. The functions of the depth signal generation apparatus 1, the stereo pair generation apparatus 2, and the stereo display apparatus 3 obviously may be achieved by a CPU and software of a computer program for operating the CPU as described above, for example. In this case, the computer program may be taken into the computer from a recording medium or may be taken into the computer via a network.

As described above, the present invention is explained through one embodiment. However, the above-described embodiment illustrates an apparatus and a method for embodying the technical idea of the present invention, and the technical idea of this invention does not specify a material, shape, structure, arrangement, and the like of a constituent as described above. The technical idea of this invention can be provided with various modifications in the range of claims.

What is claimed is:

1. A depth signal generation apparatus comprising:
   a depth signal estimation unit configured to generate a depth signal which expresses a depth for each pixel of a predetermined unit in a video image signal;
   a depth signal histogram generator configured to divide a range of a depth signal level which the depth signal can have, into a plurality of depth signal level regions each having a predetermined size, determine which depth signal level region includes the depth signal for each pixel of the predetermined unit, and count the number of pixels included in each depth signal level region to generate depth signal histogram data which expresses a level distribution of the depth signal in the depth signal level regions, according to the counted number of pixels;
   a gain correction value calculator configured to calculate a dispersion value of the depth signal histogram data and calculate a gain correction value according to the dispersion value;
   a point generator configured to generate points for generating a depth signal level conversion curve to be used to perform level conversion of the depth signal, according to the gain correction value;
   an interpolation data generator configured to generate interpolation data which interpolates between the points in the depth signal level conversion curve; and
   a conversion curve generator configured to generate the depth signal level conversion curve using the points and the interpolation data to perform the level conversion of the depth signal using the depth signal level conversion curve.

2. The depth signal generation apparatus according to claim 1, further comprising:
   a limit processor configured to generate points after limit processing by providing normalization limit processing for the points according to a predetermined limit threshold value; and
   an integration processor configured to generate points after integration processing by performing a predetermined leak-type integration processing for the points after limit processing, wherein
   the conversion curve generator generates the depth signal level conversion curve using the points after integration processing and interpolation data generated according to the points after integration processing.

3. The depth signal generation apparatus according to claim 1, wherein
   among the plurality of depth signal level regions, a region having a minimum level is denoted by a first level region and a region having a maximum level is denoted by a second level region,
   the depth signal histogram generator includes:
   a first depth signal histogram generator configured to count the number of pixels included in the first level region to a third level region which has a level higher than that of the first level region and smaller than that of the second level region to generate a first depth signal histogram data which expresses a level distribution of the depth signal in the regions from the first level region to the third level region; and
   a second depth signal histogram generator configured to count the number of pixels included in the third level region to the second level region to generate a second depth signal histogram data which expresses a level distribution of the depth signal in the regions from the third level region to the second level region.

4. A pseudo stereo image signal generation apparatus comprising:
   the depth signal generation apparatus according to claim 1; and
   a stereo pair generation apparatus configured to generate a left eye image signal and a right eye image signal by shifting a texture of the video image signal according to the video image signal and the depth signal which is provided with the level conversion by the depth signal generation apparatus.

5. A depth signal generation method, comprising:
   generating a depth signal which expresses a depth for each pixel of a predetermined unit in a video image signal;
   dividing a range of a depth signal level which the depth signal can have, into a plurality of depth signal level regions each having a predetermined size, determining which depth signal level region includes the depth signal for each pixel of the predetermined unit, and counting the number of pixels included in each depth signal level region to generate depth signal histogram data which expresses a level distribution of the depth signal in the depth signal level regions, according to the counted number of pixels;

calculating a dispersion value of the depth signal histogram data and calculating a gain correction value according to the dispersion value;

generating points for generating a depth signal level conversion curve to be used to perform level conversion of the depth signal, according to the gain correction value;

generating interpolation data which interpolates between the points in the depth signal level conversion curve; and generating the depth signal level conversion curve using the points and the interpolation data to perform the level conversion of the depth signal using the depth signal level conversion curve.

6. A pseudo stereo image signal generation method comprising:

the depth signal generation method according to claim 5; and generating a left eye image signal and a right eye image signal by shifting a texture of the video image signal according to the video image signal and the depth signal which is provided with the level conversion.

7. A computer readable non-transitory recording medium recording a depth signal generation program therein for causing a computer to execute a method comprising:

generating a depth signal which expresses a depth for each pixel of a predetermined unit in a video image signal;

dividing a range of a depth signal level which the depth signal can have, into a plurality of depth signal level regions each having a predetermined size, determining which depth signal level region includes the depth signal for each pixel of the predetermined unit, and counting the number of pixels included in each depth signal level region to generate depth signal histogram data which expresses a level distribution of the depth signal in the depth signal level regions, according to the counted number of pixels;

calculating a dispersion value of the depth signal histogram data and calculating a gain correction value according to the dispersion value;

generating points for generating a depth signal level conversion curve to be used to perform level conversion of the depth signal, according to the gain correction value;

generating interpolation data which interpolates between the points in the depth signal level conversion curve; and generating the depth signal level conversion curve using the points and the interpolation data to perform the level conversion of the depth signal using the depth signal level conversion curve.

8. A computer readable non-transitory recording medium recording a pseudo stereo image signal generation program therein for causing a computer to execute a method comprising:

the method according to claim 7; and generating a left eye image signal and a right eye image signal by shifting a texture of the video image signal according to the video image signal and the depth signal which is provided with the level conversion.

* * * * *